(12) United States Patent
Kiyokami et al.

(10) Patent No.: US 10,084,359 B2
(45) Date of Patent: Sep. 25, 2018

(54) ELECTRIC MOTOR

(71) Applicant: TOYOTA JIDOSHA KABUSHIKI KAISHA, Toyota-shi, Aichi-ken (JP)

(72) Inventors: Hiroaki Kiyokami, Nisshin (JP); Takuya Kodama, Nisshin (JP); Yasuhiro Saito, Toyota (JP); Mitsutaka Matsumura, Suntou-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 15/027,517

(22) PCT Filed: Oct. 13, 2014

(86) PCT No.: PCT/IB2014/002306
§ 371 (c)(1),
(2) Date: Apr. 6, 2016

(87) PCT Pub. No.: WO2015/056088
PCT Pub. Date: Apr. 23, 2015

(65) Prior Publication Data
US 2016/0248303 A1    Aug. 25, 2016

(30) Foreign Application Priority Data

Oct. 18, 2013   (JP) .................... 2013-217780

(51) Int. Cl.
*H02K 9/19*  (2006.01)
*F16H 57/04* (2010.01)
(Continued)

(52) U.S. Cl.
CPC ............. *H02K 9/19* (2013.01); *H02K 1/2706* (2013.01); *F16H 57/04* (2013.01); *H02K 7/003* (2013.01)

(58) Field of Classification Search
CPC ........ H02K 9/19; H02K 7/003; H02K 1/2706; F16H 57/04
(Continued)

(56) References Cited

U.S. PATENT DOCUMENTS 7,211,025 B2 * 5/2007 Fujioka .................. B60K 6/387
                                                        310/113
7,456,536 B2 * 11/2008 Tanaka .................. H02K 5/1732
                                                        310/90
(Continued)

FOREIGN PATENT DOCUMENTS

| JP | H09-154257 A | | 6/1997 | |
| JP | H09-154258 A | | 6/1997 | |
| JP | 005239814 | * | 4/2013 | ............... H02K 9/19 |

*Primary Examiner* — Burton Mullins
(74) *Attorney, Agent, or Firm* — Oliff PLC

(57) ABSTRACT

An electric motor includes a rotor shaft, and the rotor shaft has a shaft-core oil passage and radial oil passages. The shaft-core oil passage includes an inner wall facing radially inward. The radial oil passages are provided toward a radial outer side of the rotor shaft from the shaft-core oil passage. The radial oil passages penetrate through the rotor shaft. The radial oil passages have corresponding one of first connection openings connected to the shaft-core oil passage, so that oil that is not discharged from the first connection openings to the radial oil passage is supplied to other supply destinations. A distance of the first connection openings from the shaft core is shorter than a distance, from the shaft core, of that part of the inner wall which is not provided with the first connection openings.

3 Claims, 5 Drawing Sheets

(51) Int. Cl.
*H02K 1/27* (2006.01)
*H02K 7/00* (2006.01)

(58) Field of Classification Search
USPC .................................. 310/54, 61; 464/7, 17
See application file for complete search history.

(56) References Cited

U.S. PATENT DOCUMENTS

| | | | | |
|---|---|---|---|---|
| 7,975,804 | B2* | 7/2011 | Kuryu | F16C 3/02 184/6.12 |
| 8,492,941 | B2* | 7/2013 | Endo | H02K 9/19 310/59 |
| 2011/0169353 | A1 | 7/2011 | Endo | |
| 2012/0299404 | A1* | 11/2012 | Yamamoto | H02K 1/2766 310/61 |
| 2013/0151057 | A1* | 6/2013 | Matsubara | B60K 6/445 701/22 |
| 2015/0080134 | A1* | 3/2015 | Tage | F16H 57/0426 464/7 |

\* cited by examiner

ELECTRIC MOTOR

BACKGROUND OF THE INVENTION

1. Field of the Invention

The present invention relates to an electric motor preferably used in a vehicle, and particularly, to improvement to balance cooling of the electric motor with lubrication thereof.

2. Description of Related Art

There has been known an electric motor including an shaft-core oil passage formed in a shaft core of a rotor shaft in a coaxial manner with the rotor shaft, and a radial oil passage provided in a penetrating manner toward a radial outer side of the rotor shaft from the shaft-core oil passage. In such an electric motor, a technique to realize effective cooling is suggested. An example of such a technique is a forcible oil-cooled electric motor described in Japanese Patent Application Publication No. 9-154258 (JP 9-154258 A). According to the technique, a tapered shaft-core oil passage is formed in a shaft core of the rotor shaft so that its oil input side has a small diameter and its oil output side has a large diameter, thereby making it possible to realize effective cooling.

In the meantime, oil to be supplied into the rotor shaft is used to cool down parts including a magnet in the electric motor, and is also used to lubricate parts including bearings pivotally supporting the rotor shaft. However, in the conventional technique, even in a case where a necessity of cooling is relatively small, for example, even in a case where a rotation speed of the electric motor is relatively low, the oil is preferentially supplied to an oil passage for cooling, which may result in that the oil may not sufficiently spread over parts that require lubrication. In view of this, development of an electric motor that balances cooling of the electric motor with lubrication thereof has been demanded.

SUMMARY OF THE INVENTION

The present invention has been achieved in view of the above circumstances as a background, and provides an electric motor that successfully balances cooling of the electric motor with lubrication thereof.

An electric motor of a first aspect of the present invention has the following configuration. An electric motor includes a rotor shaft. The rotor shaft has a shaft-core oil passage and radial oil passages. The shaft-core oil passage is placed in a shaft core of the rotor shaft in a coaxial manner with the rotor shaft, the shaft-core oil passage includes an inner wall facing radially inward. The radial oil passages are provided toward a radial outer side of the rotor shaft from the shaft-core oil passage. The radial oil passages are penetrating through the rotor shaft. The radial oil passages have corresponding one of first connection openings connected to the shaft-core oil passage, so that oil that is not discharged from the first connection openings to the radial oil passages is supplied to other supply destinations. A distance of the first connection openings from the shaft core is shorter than a distance, from the shaft core, of a part of the inner wall which is not provided with the first connection openings.

According to the electric motor, the distance of the first connection openings from the shaft core is shorter than the distance, from the shaft core, of that part of the inner wall which is not provided with the first connection openings. The first connection opening is a connection opening of the radial oil passage with respect to the shaft-core oil passage. Accordingly, in a case where an amount of oil to be supplied to the shaft-core oil passage is relatively large, the oil is supplied to the radial oil passages, so that cooling is performed appropriately. In a case where the amount of the oil to be supplied to the shaft-core oil passage is relatively small, the oil is not flowed through the radial oil passages, so that a sufficient amount of the oil can be supplied to other parts that require lubrication. That is, it is possible to provide an electric motor that successfully balances cooling of the electric motor with lubrication thereof.

The electric motor may include the following configuration, so that the part of the inner wall which is not provided with the first connection openings may have grooves extending in a shaft-core direction. According to such a configuration, the distance of the first connection openings from the shaft core can be configured to be shorter than the distance, from the shaft core, of that part of the inner wall which is not provided with the first connection openings.

The electric motor may include the following configuration, such that the number of grooves may be an integral multiple of the number of magnets provided in the rotor, and a phase of each of the magnets in a circumferential direction of the rotor shaft may corresponds to a phase of at least one of the radial oil passages. According to such a configuration, it is possible to realize the cooling of the electric motor appropriately even with a relatively small oil amount.

The electronic motor may further include a bearing which is configured to pivotally support the rotor shaft. Also, the rotor shaft may have a lubrication oil passage, so that the lubrication oil passage guides the oil in the shaft-core oil passage to the bearing. The lubrication oil passage may have a second connection opening connected to the shaft-core oil passage. Furthermore, a distance of the second connection opening from the shaft core may be longer than a distance of at least one of the first connection openings from the shaft core. According to such a configuration, in a case where the amount of the oil to be supplied to the shaft-core oil passage is relatively small, it is possible to supply a sufficient amount of the oil to the bearing that requires lubrication.

Furthermore, the electronic motor may further comprise a source which is configured to supply the oil to the shaft-core oil passage, so that the source supplies more oil to the shaft-core oil passage as a rotation speed of the electric motor is larger. According to such a configuration, in a case where the rotation speed of the electric motor is relatively large and a necessity of the cooling of the electric motor is relatively large, the oil is supplied to the radial oil passages, so that the cooling is performed appropriately. In a case where the rotation speed of the electric motor is relatively small and the necessity of the cooling of the electric motor is relatively small, the oil is not flowed through the radial oil passages, so that a sufficient amount of the oil can be supplied to other parts that require lubrication.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The present invention is preferably applied to a vehicle electric motor provided in a hybrid vehicle or the like and functioning as at least one of a driving force source for generating a driving force for running and a generator for generating electric power. Alternatively, the present invention may be applied to a rear-wheel motor in a vehicle including the rear-wheel motor (Rr motor) for generating a driving force in a rear wheel. The present invention may be applied to an EV motor (T/A motor) provided in an electric vehicle (an EV vehicle).

The present invention is preferably configured such that a pipe is provided so as to radially penetrate through the rotor shaft, an opening is formed in the pipe on an oil source side in a shaft-core direction of the rotor shaft, and the opening is provided on a small-diameter side relative to an inner wall where the opening is not provided, within the same peripheral surface of the shaft-core oil passage. According to such a configuration, the opening as a connection opening with the shaft-core oil passage in a hollow of the pipe functioning as the radial oil passage can be provided, in a practical manner, on the small-diameter side relative to the inner wall where the opening is not provided, within the same peripheral surface of the shaft-core oil passage.

The present invention is preferably configured such that the rotor shaft is splined to an output shaft of the electric motor, and a groove extending in the shaft-core direction of the rotor shaft is formed by extending a spline groove, for the splining, formed on an inner peripheral side of the rotor shaft. According to such a configuration, it is possible to successfully balance cooling of the electric motor with lubrication thereof, and further, it is also possible to reduce a man-hour in a manufacturing process thereof in comparison with a configuration in which the groove is formed separately from the spline groove.

The present invention is preferably configured such that the radial oil passage guides oil in the shaft-core oil passage to the vicinity of a magnet provided in the rotor. According to such a configuration, it is possible to effectively cool down the magnet that is highly required to be cooled down.

Hereinafter, a preferred embodiment of the present invention will be described in detail with reference to the drawings.

Figure 1:
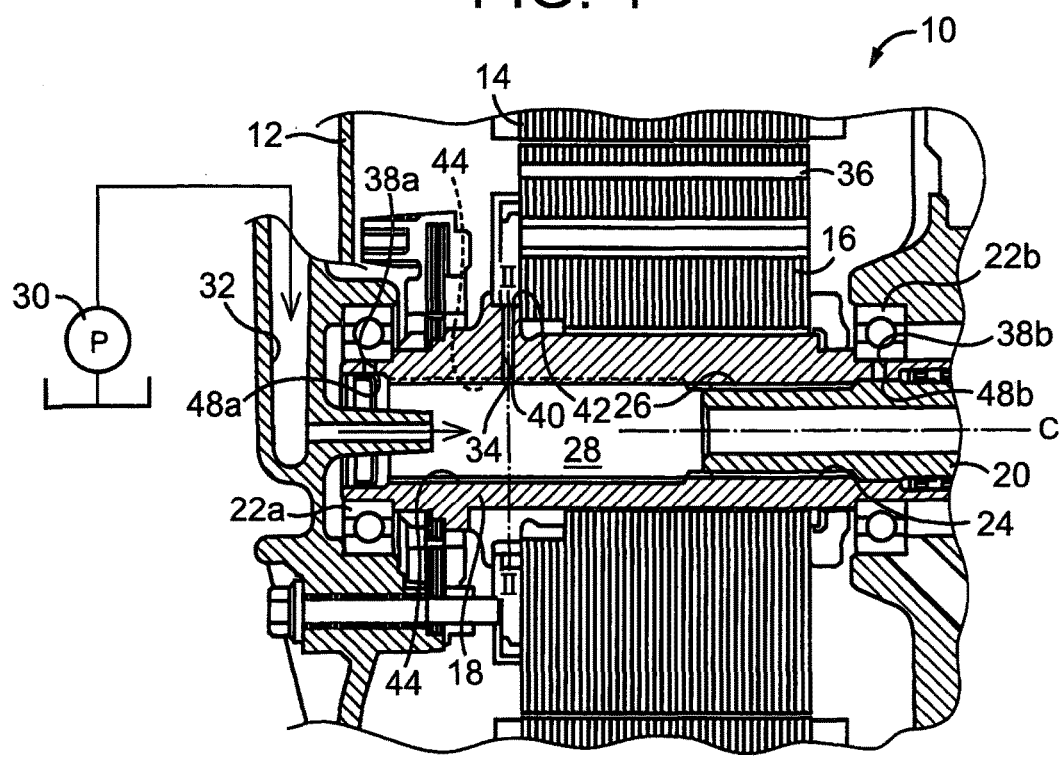
FIG. 1 is a sectional view illustrating that partial configuration of an electric motor according to a preferred embodiment of the present invention which includes a shaft core thereof, so as to describe a configuration of the electric motor, and is a sectional view taken along a line I-I in FIG. 2.

FIG. 1 is a view to describe a configuration of an electric motor 10 to which the present invention is preferably applied, and is a sectional view illustrating a partial configuration thereof including its shaft core C. The electric motor 10 is preferably a vehicle electric motor provided in a hybrid vehicle, an EV vehicle, or the like and functioning as at least one of a driving force source (a driving motor) for generating a driving force for running and a generator for generating electric power. As illustrated in FIG. 1, the electric motor 10 includes a stator 14, a rotor 16, a rotor shaft 18, an output shaft 20, and so on in a coaxial manner around the shaft core C within a housing (a motor case) 12, which is a non-rotational member. The shaft core C is a shaft core (a shaft center) of the rotor shaft 18, and corresponds to a rotation center of the rotor shaft 18 or a rotation center of the rotor 16.

The stator 14 corresponds to a stationary part of the electric motor 10, and is fixed to the housing 12. The rotor 16 corresponds to a rotator of the electric motor 10, and is provided on an inner peripheral side of the stator 14 at a given space therebetween in a relatively rotatable manner around their common shaft core C. The rotor 16 includes a magnet (permanent magnet) 36 configured to be elongated in a shaft-core-C direction. Preferably, a plurality of magnets 36 is evenly provided in a circumferential direction of the rotor 16.

The rotor shaft 18 is provided on an inner peripheral side of the rotor 16 so as to support the rotor 16. That is, the rotor 16 is provided on an outer peripheral side of the rotor shaft 18, so as to be non-rotatable relative to the rotor shaft 18. The rotor shaft 18 is supported by bearings 22a, 22b (hereinafter just referred to as the bearings 22 when they are not distinguished in particular) provided in both ends of the rotor shaft 18, so that the rotor shaft 18 is rotatable (spinning) around the shaft core C relative to the housing 12. That is, in the present embodiment, the bearings 22 correspond to bearings for pivotally supporting the rotor shaft 18. The bearing 22 is fitted to a play between the rotor shaft 18 and the housing 12, so that a gap is formed between an inner race of the bearing 22 and the rotor shaft 18 to such an extent that oil passes therethrough. The output shaft 20 is splined to the rotor shaft 18. That is, a spline groove 24 is formed on an inner peripheral side of the rotor shaft 18 and a spline 26 to be fitted to the spline groove 24 is formed on an outer peripheral side of the output shaft 20. When the spline groove 24 of the rotor shaft 18 is mutually fitted to the spline 26 of the output shaft 20, the rotor shaft 18 and the output shaft 20 integrally rotate (spin) around their common shaft core C.

The rotor shaft 18 includes a shaft-core oil passage 28 formed in the shaft core C in a coaxial manner with the rotor shaft 18. That is, that part of an inner peripheral side of the rotor shaft 18 which includes the shaft core C and has a given radial dimension is hollow, and the hollow functions as the shaft-core oil passage 28. In other words, the rotor shaft 18 is a member having a generally cylindrical shape in which that part of the rotor shaft 18 which includes the shaft core C is hollow. In the shaft-core oil passage 28, oil used for cooling, lubrication, and the like of the electric motor 10 is circulated. That is, in the rotor shaft 18, the shaft-core oil passage 28 serving as a flow passage where the oil is circulated is formed inside the rotor shaft 18, that is, in that part of the rotor shaft 18 which includes the shaft core C on its inner side.

The electric motor 10 includes an oil pump 30 as a source for supplying the oil to the shaft-core oil passage 28. The oil pump 30 is a mechanical oil pump connected to a driving force source or the like of the vehicle, an electric oil pump for generating hydraulic pressure by an electrical motor, or the like well-known oil pump (hydraulic pump). Preferably, the oil pump 30 is a mechanical oil pump connected to the output shaft 20 or the like of the electric motor 10 and configured to generate hydraulic pressure along with rotation of the electric motor 10. Alternatively, the oil pump 30 may be an oil pump connected to an internal combustion engine such as an engine (not shown) and configured to generate hydraulic pressure along with rotation of the internal combustion engine. As illustrated by an arrow in FIG. 1, the oil output from the oil pump 30 is supplied (flowed) to the shaft-core oil passage 28 via a supply oil passage 32 formed integrally with the housing 12.

The oil pump 30 preferably supplies more oil to the shaft-core oil passage 28 as a rotation speed of the electric motor 10 is larger. For example, in a case where the oil pump 30 is a mechanical oil pump connected to the output shaft 20 or the like of the electric motor 10 and configured to generate hydraulic pressure along with rotation of the electric motor 10, as the rotation speed of the electric motor 10 is larger, a flow rate of the oil output from the oil pump 30 increases. In a case where the oil pump 30 is an electric oil pump configured to generate hydraulic pressure by an electric motor, driving of the electric motor is controlled so that a rotation speed of the electric motor becomes larger as the rotation speed of the electric motor 10 is larger. Hereby, the flow rate of the oil output from the oil pump 30 increases as the rotation speed of the electric motor 10 is larger.

Figure 2:
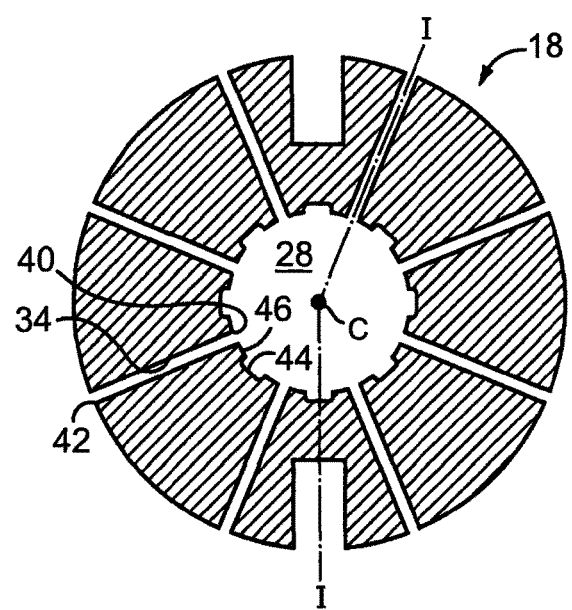
FIG. 2 is a sectional view taken along a line II-II in FIG. 1.

FIG. 2 is a view partially illustrating the rotor shaft 18 so as to describe a configuration of the rotor shaft 18 more specifically, and is a view taken along a line II-II in FIG. 1. As illustrated in FIG. 2, the rotor shaft 18 is provided with radial oil passages 34 in a penetrating manner toward a radial outer side of the rotor shaft 18 from the shaft-core oil passage 28. Preferably, as illustrated in FIG. 2, a plurality of radial oil passages 34 (eight radial oil passages 34 in FIG. 2) is formed evenly in a circumferential direction of the rotor shaft 18. Preferably, the radial oil passage 34 is formed in a position corresponding to a flange portion (a rib portion) provided so as to project on the outer peripheral side of the rotor shaft 18. Preferably, the radial oil passages 34 are provided radially around the shaft core C of the rotor shaft 18. The radial oil passage 34 connects the shaft-core oil passage 28 to the outer peripheral side of the rotor shaft 18. That is, the radial oil passages 34 each include a connection opening 40 with respect to the shaft-core oil passage 28, and an opening 42 on an outer peripheral surface of the rotor shaft 18. The oil supplied into the shaft-core oil passage 28 is flowed to the outer peripheral side of the rotor shaft 18 via the radial oil passages 34, and then supplied for cooling or the like of the magnets 36 provided in the rotor 16 from a side portion of the rotor 16. That is, the rotor shaft 18 is provided with the radial oil passages 34 as cooling oil passages for guiding the oil in the shaft-core oil passage 28 to parts (e.g., the magnets 36) that require cooling in the electric motor 10.

In the rotor shaft 18, the oil that is not discharged from the connection openings 40 of the radial oil passages 34 with respect to the shaft-core oil passage 28 is supplied to other supply destinations including the bearings 22*a*, 22*b*. The rotor shaft 18 includes lubrication oil passages 38*a*, 38*b* for guiding the oil in the shaft-core oil passage 28 to the bearings 22*a*, 22*b* (hereinafter just referred to as the lubrication oil passage 38 when they are not distinguished in particular). That is, as illustrated in FIG. 1, in respective positions of the rotor shaft 18 corresponding to the bearings 22*a*, 22*b* in the shaft-core-C direction, the lubrication oil passages 38*a*, 38*b* for guiding the oil in the shaft-core oil passage 28 to the bearings 22*a*, 22*b* are provided in a penetrating manner toward the radial outer side of the rotor shaft 18 from the shaft-core oil passage 28. The oil supplied into the shaft-core oil passage 28 is flowed to the outer peripheral side of the rotor shaft 18 via the lubrication oil passage 38, and then supplied for lubrication of the bearings 22. Particularly, as for the bearing 22*b*, the oil that is supplied into the shaft-core oil passage 28 and circulated in the shaft-core oil passage 28 in the shaft-core-C direction reaches the lubrication oil passage 38*b* via a spline portion between the rotor shaft 18 and the output shaft 20, and then, the oil is supplied to the bearing 22*b* via the lubrication oil passage 38*b*.

As illustrated in FIG. 2, in the rotor shaft 18, the connection opening 40 of the radial oil passage 34 with respect to the shaft-core oil passage 28 is provided on a small-diameter side relative to an inner wall (an inner peripheral surface) where the connection opening 40 is not provided, within the same peripheral surface of the shaft-core oil passage 28. That is, the connection opening 40 is provided on a radial inner side of the rotor shaft 18 relative to the inner wall. Further, in other words, a distance of the connection opening 40 from the shaft core is smaller than a distance of the inner wall from the shaft core. Preferably, in that inner peripheral surface of the shaft-core oil passage 28 which is not provided with the connection opening 40, a plurality of grooves 44 (eight grooves 44 in FIG. 2) extending in the shaft-core-C direction of the rotor shaft 18 is formed. In other words, the rotor shaft 18 is provided with the plurality of grooves 44 formed so as to radially dig into an inner peripheral surface 46 where the connection openings 40 are opened. The groove 44 corresponds to the inner wall that is not provided with the connection opening 40. The grooves (inner walls) 44 are evenly formed in the circumferential direction of the rotor shaft 18. Preferably, one groove 44 is formed between radial oil passages 34 adjacent to each other.

In the rotor shaft 18, preferably, connection openings 48*a*, 48*b* (hereinafter just referred to as the connection opening 48 when they are not distinguished in particular) of the lubrication oil passages 38*a*, 38*b* with respect to the shaft-core oil passage 28 are provided on a large-diameter side relative to the connection opening 40 of at least one of the radial oil passages 34 with respect to the shaft-core oil passage 28. That is, the connection opening 48 of the lubrication oil passage 38 is provided on a radial outer side of the rotor shaft 18 relative to the connection opening 40 of the radial oil passage 34. Further, in other words, a distance of the connection opening 48 from the shaft core is longer than the distance of the connection opening 40 from the shaft core.

Figure 3:
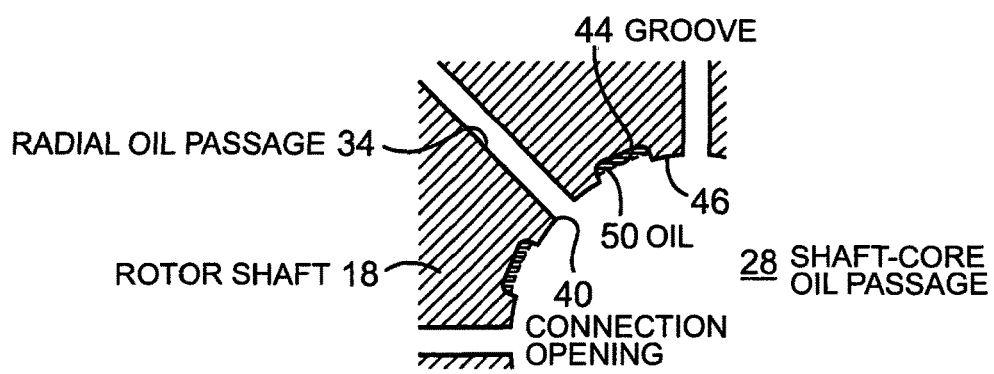
FIG. 3 is a partial sectional view illustrating part of a rotor shaft so as to describe an effect of the electric motor of FIG. 1, and exemplifies a case where an oil amount is relatively small.
Figure 4:
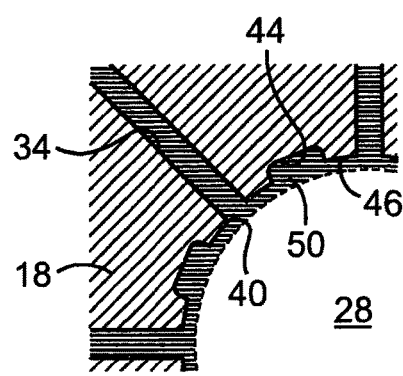
FIG. 4 is a partial sectional view illustrating part of the rotor shaft so as to describe the effect of the electric motor of FIG. 1, and exemplifies a case where the oil amount is relatively large.

FIGS. 3 and 4 are partial sectional views each illustrating part of the rotor shaft 18 so as to describe an effect of the electric motor 10 of the present embodiment. In FIGS. 3 and 4, an oil level of an oil 50 circulated in the shaft-core oil passage 28 is indicated by a broken line, and a part where the oil 50 exists is indicated by a horizontal-line range. FIG. 3 illustrates a case where an oil amount to be supplied to the shaft-core oil passage 28 is relatively small, and FIG. 4 illustrates a case where the oil amount to be supplied to the shaft-core oil passage 28 is relatively large. The oil supplied into the shaft-core oil passage 28 is flowed toward the outer peripheral side of the rotor shaft 18 due to a centrifugal force along with rotation of the rotor shaft 18, so that the oil is supplied to the rotor 16 via the radial oil passages 34 so as to be used for cooling of the magnets 36, and the oil is also supplied to the bearings 22 via the lubrication oil passages 38 so as to be used for lubrication of the bearings 22. Here, it is necessary to balance the cooling of the electric motor 10 with the lubrication thereof. Particularly, oil supply to the lubrication oil passage 38*b* that is relatively distanced from the supply oil passage 32 as an oil supply port in the shaft-core-C direction would be a problem. Conceivable measures to this problem are as follows, for example: (a) a passage to flow the oil outside the stator 14 is provided; (b) another shaft is provided inside the rotor shaft 18 so as to pass the oil therethrough; and (c) the oil is passed through the hollow formed in the shaft core of the rotor shaft 18. However, the measure (a) causes such a problem that since the passage is provided outside the stator 14, a body of a motor case is increased in size by just that much, which decreases mountability. Further, the measure (b) causes such a problem that since another shaft is provided in the rotor shaft 18, its structure becomes complicated. Also in the measure (c), in a configuration where oil for cooling and oil for lubrication are both passed through the hollow, a large amount of oil flows for cooling, for example, which may cause such a problem that a sufficient amount of oil does not flow for lubrication.

Since the electric motor 10 of the present embodiment is configured as described above, in a case where the rotation speed of the electric motor 10 is relatively small and the oil amount to be supplied to the shaft-core oil passage 28 is relatively small, for example, the oil 50 is not flowed into the radial oil passages 34 as illustrated in FIG. 3. Hereby, the oil 50 is circulated in the shaft-core-C direction through the grooves 44 extending in the shaft-core-C direction, so that the oil 50 reaches the lubrication oil passage 38*b* appropriately. In a case where the rotation speed of the electric motor 10 is relatively small, it is conceivable that a necessity of cooling of the magnets 36 is low, while lubrication of the bearing 22*b* is required. However, according to the present embodiment, appropriate lubrication can be realized. In a case where the rotation speed of the electric motor 10 is relatively large and the oil amount to be supplied to the shaft-core oil passage 28 is relatively large, for example, the oil 50 is flowed into the radial oil passages 34 as illustrated in FIG. 4, and the oil 50 is also circulated in the shaft-core-C direction through the grooves 44 extending in the shaft-core-C direction, so that the oil 50 reaches the lubrication oil passage 38*b* appropriately. That is, the cooling of the magnets 36 is balanced with the lubrication of the bearing 22*b*. As described above, according to the configuration of the present embodiment, while an appropriate amount of the oil 50 is always supplied to the lubrication oil passage 38*b*, the oil 50 is supplied to the radial oil passages 34 only when the cooling of the magnets 36 is highly required. Hereby, it is possible to successfully balance the cooling of the electric motor 10 with the lubrication thereof.

Thus, according to the present embodiment, the connection openings 40 of the radial oil passages 34 with respect to the shaft-core oil passage 28 are provided on the small-diameter side relative to the inner wall that is not provided with the connection openings 40, within the same peripheral surface of the shaft-core oil passage 28. Accordingly, in a case where the amount of the oil 50 to be supplied to the shaft-core oil passage 28 is relatively large, the oil 50 is supplied to the radial oil passages 34, and the cooling is performed appropriately. In a case where the amount of the oil 50 to be supplied to the shaft-core oil passage 28 is relatively small, the oil 50 is not flowed through the radial oil passages 34, and a sufficient amount of the oil can be supplied to other parts that require lubrication. That is, it is possible to provide the electric motor 10 that successfully balances cooling with lubrication.

Since the grooves 44 extending in the shaft-core-C direction of the rotor shaft 18 are formed on that inner wall of the shaft-core oil passage 28 which is not provided with the connection opening 40, it is possible to realize, in a practical manner, such a configuration that the connection openings 40 of the radial oil passages 34 with respect to the shaft-core oil passage 28 are provided on the small-diameter side relative to the inner wall that is not provided with the connection opening 40, within the same peripheral surface of the shaft-core oil passage 28.

The electric motor 10 includes the bearing 22 as the bearing for pivotally supporting the rotor shaft 18, the rotor shaft 18 includes the lubrication oil passage 38 for guiding the oil 50 in the shaft-core oil passage 28 to the bearing 22, and the connection opening 48 of the lubrication oil passage 38 with respect to the shaft-core oil passage 28 is provided on the large-diameter side relative to the connection opening 40 of at least one of the radial oil passages 34 with respect to the shaft-core oil passage 28. Accordingly, in a case where the amount of the oil 50 to be supplied to the shaft-core oil passage 28 is relatively small, it is possible to supply a sufficient amount of the oil to the bearing 22 that requires lubrication.

The electric motor 10 includes the oil pump 30 as a source for supplying the oil to the shaft-core oil passage 28, and the oil pump 30 supplies more oil to the shaft-core oil passage 28 as the rotation speed of the electric motor 10 is larger. Accordingly, in a case where the rotation speed of the electric motor 10 is relatively large and the necessity of the cooling of the electric motor 10 is relatively large, the oil 50 is supplied to the radial oil passages 34, so that the cooling is performed appropriately. In a case where the rotation speed of the electric motor 10 is relatively small and the necessity of the cooling of the electric motor 10 is relatively small, the oil is not flowed through the radial oil passage 34, so that a sufficient amount of the oil can be supplied to other parts that require lubrication.

Next will be described another preferred embodiment of the present invention in detail with reference to the drawings. The same reference sign is assigned to a portion common to the above embodiment, and a description thereof is omitted.

Figure 5:
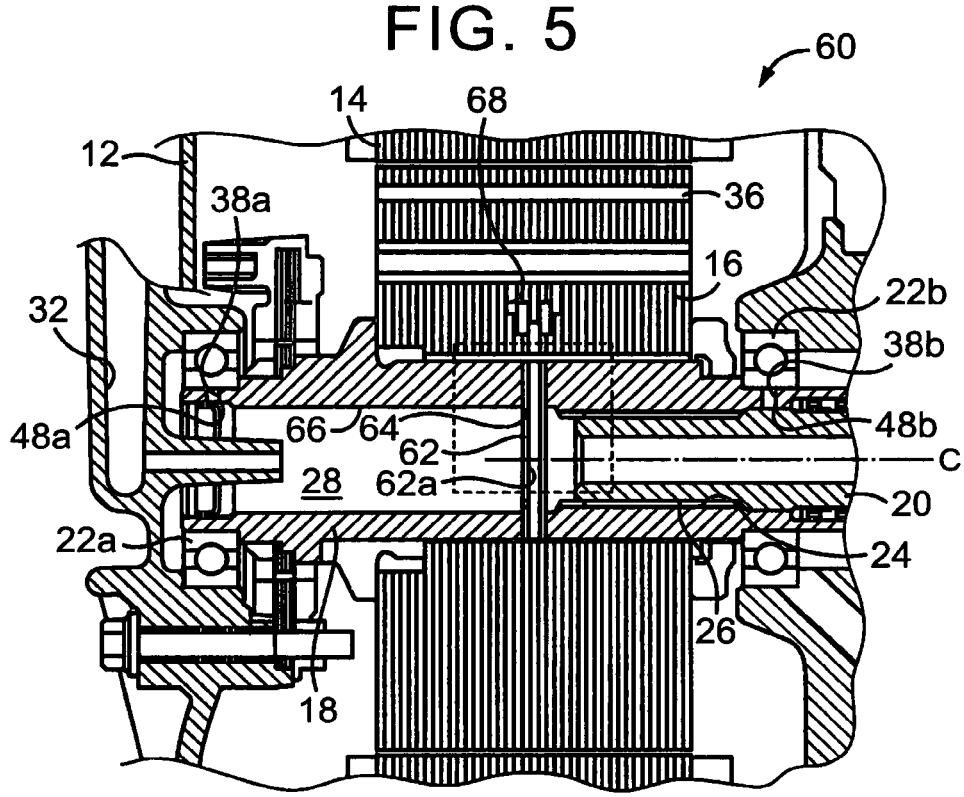
FIG. 5 is a sectional view illustrating that partial configuration of an electric motor according to another embodiment of the present invention which includes a shaft core thereof, so as to describe a configuration of the electric motor.
Figure 6:
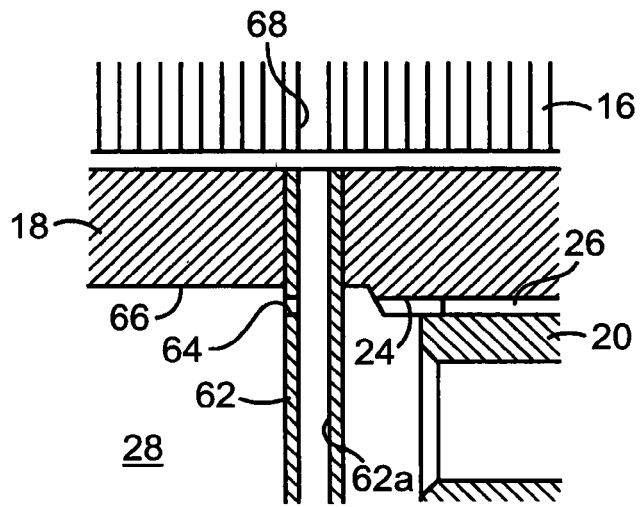
FIG. 6 is a view illustrating a part surrounded by a broken line in FIG. 5, in a magnified manner.

FIG. 5 is a view to describe a configuration of an electric motor 60 according to another embodiment of the present invention, and is a sectional view illustrating a partial configuration thereof including its shaft core C. FIG. 6 is a view illustrating a part surrounded by a broken line in FIG. 5, in a magnified manner. As illustrated in FIGS. 5 and 6, a rotor shaft 18 provided in the electric motor 60 of the present embodiment includes a pipe 62 that penetrates through the rotor shaft 18 in a radial direction thereof. The pipe 62 is a tube-like (cylindrical) member including a hollow (an inner hole) 62*a* with a predetermined diameter dimension including its shaft core. At least one pipe 62 may be provided, but a plurality of pipes 62 may be provided. The pipe 62 is provided with an opening 64 on a supply-oil-passage-32 side of the rotor shaft 18 in a shaft-core-C direction so that the opening 64 penetrates through the pipe 62 from the hollow to an outer peripheral surface of the pipe 62. A rotor 16 is provided with a guide oil passage 68 for guiding oil supplied from the pipe 62, into the rotor 16. According to such a configuration, oil in a shaft-core oil passage 28 is introduced into the pipe 62 from the opening 64, and guided to an outer peripheral side of the rotor shaft 18. Then, the oil is guided in the vicinity to magnets 36 via the guide oil passage 68 formed in the rotor 16. That is, in the present embodiment, the hollow 62a of the pipe 62 corresponds to a radial oil passage provided in a penetrating manner toward a radial outer side of the rotor shaft 18 from the shaft-core oil passage 28. The opening 64 corresponds to a connection opening of the radial oil passage with respect to the shaft-core oil passage 28. No groove 44 extending in the shaft-core-C direction is formed in an inner peripheral portion of the rotor shaft 18. In other words, an inner peripheral surface of the shaft-core oil passage 28 formed in the rotor shaft 18 is an inner peripheral surface 66 having a generally cylindrical shape.

As illustrated in FIG. 6, the opening 64 formed in the pipe 62 is provided on a small-diameter side relative to the inner peripheral surface 66 of the shaft-core oil passage 28. That is, that opening 64 as the connection opening with respect to the shaft-core oil passage 28 which is provided for the hollow 62a of the pipe 62 as the radial oil passage is provided on the small-diameter side relative to the inner peripheral surface 66 as an inner wall within the same peripheral surface of the shaft-core oil passage 28. Even in such a configuration, in a case where a rotation speed of the electric motor 60 is relatively large and a necessity of cooling of the electric motor 60 is relatively large, an oil 50 is supplied to the hollow 62a of the pipe 62 as the radial oil passage, and the cooling is performed appropriately. In a case where the rotation speed of the electric motor 60 is relatively small and the necessity of the cooling of the electric motor 60 is relatively small, the oil is not flowed through the hollow 62a of the pipe 62, so that a sufficient amount of the oil can be supplied to other parts, such as a bearing 22b, that require lubrication.

Figure 7:
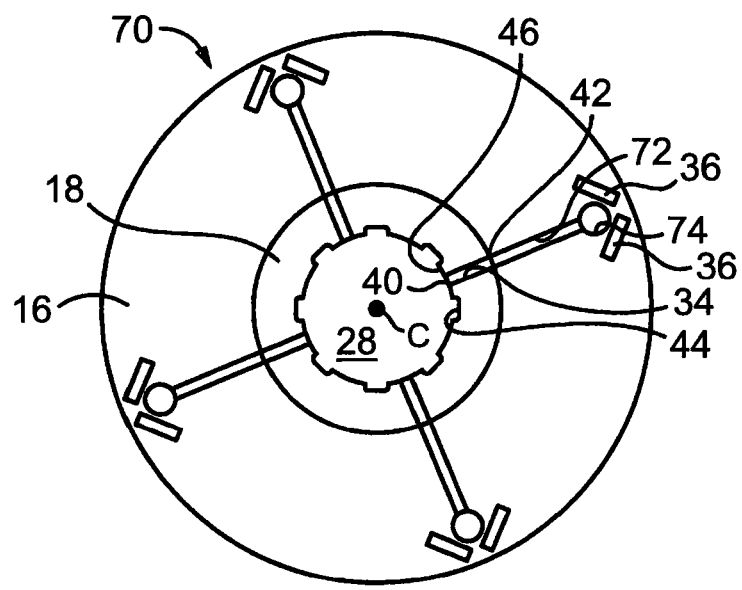
FIG. 7 is a view diagrammatically illustrating a configuration of an electric motor according to further another embodiment of the present invention in a perpendicular manner to its shaft core.

FIG. 7 is a view to describe a configuration of an electric motor 70 according to further another embodiment of the present invention, and is a view diagrammatically illustrating a state where a rotor 16 and a rotor shaft 18 in the electric motor 70 are viewed in a direction perpendicular to a shaft core C of the electric motor 70. As illustrated in FIG. 7, the rotor 16 included in the electric motor 70 of the present embodiment is provided with a guide oil passage 72 for guiding oil supplied from a radial oil passage 34 of the rotor shaft 18, into the rotor 16. In the rotor 16, an axial oil passage 74 extending in a shaft-core-C direction of the rotor shaft 18 is formed in the vicinity of magnets 36. The axial oil passage 74 is connected (conducted) to the guide oil passage 72. According to such a configuration, oil in a shaft-core oil passage 28 is guided to an outer peripheral side of the rotor shaft 18 via the radial oil passage 34. Then, the oil is supplied to the axial oil passage 74 via the guide oil passage 72 formed in the rotor 16, thereby effectively cooling the magnets 36.

As illustrated in FIG. 7, in the rotor shaft 18 included in the electric motor 70, four radial oil passages 34 are evenly formed in a circumferential direction of the rotor shaft 18. In the rotor 16, four guide oil passages 72 and four axial oil passages 74 are formed so as to communicate with respective radial oil passages 34. Further, two magnets 36 are provided along each of the axial oil passages 74, i.e., eight magnets 36 are provided in total. That is, a phase of each of the magnets 36 in the circumferential direction of the rotor shaft 18 corresponds to a phase of each of the radial oil passages 34. Eight grooves 44 are formed as an inner wall on an inner peripheral side of the rotor shaft 18. That is, in the electric motor 70 of the present embodiment, the number of grooves 44 formed so as to extend in the shaft-core-C direction of the rotor shaft 18 is equal to the number of magnets 36. Preferably, the number of grooves 44 is an integral multiple of the number of magnets 36.

Thus, according to the present embodiment, the number of groove 44 is an integral multiple of the number of magnets 36 provided in the rotor 16, and the phase of the magnet 36 in the circumferential direction of the rotor shaft 18 corresponds to the phase of at least one of the radial oil passages 34, thereby making it possible to realize the cooling of the electric motor 70 appropriately even with a relatively small oil amount.

Figure 8:
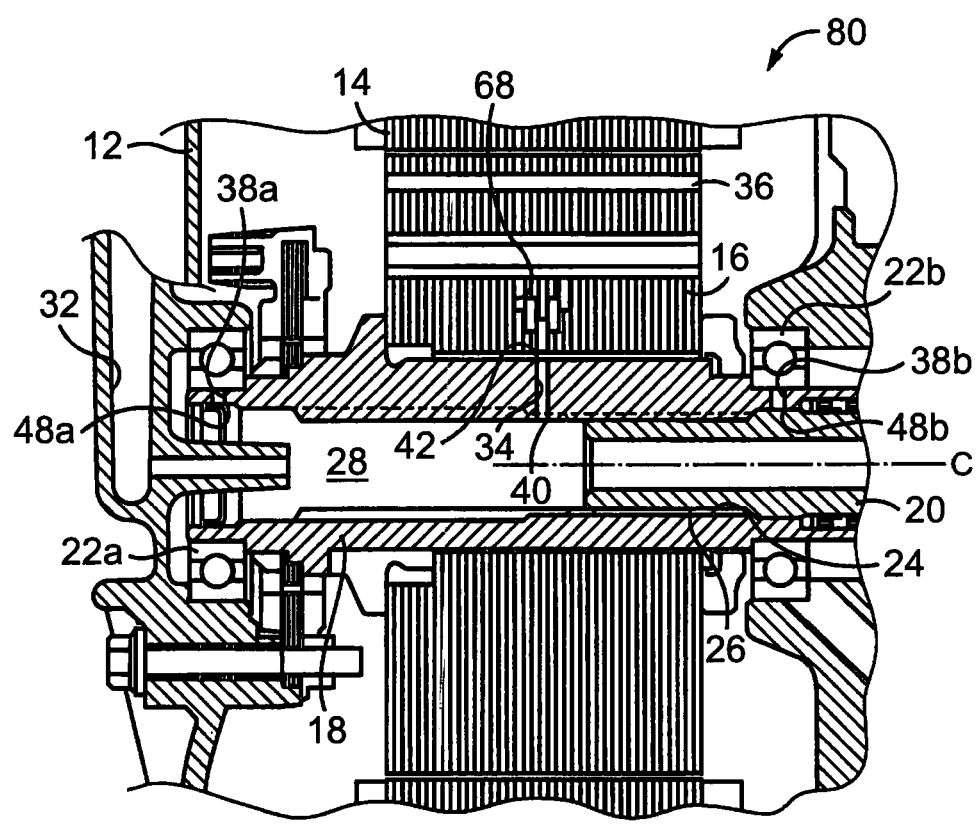
FIG. 8 is a sectional view illustrating that partial configuration of an electric motor according to further another embodiment of the present invention which includes a shaft core thereof, so as to describe a configuration of the electric motor.

FIG. 8 is a view to describe a configuration of an electric motor 80 according to further another embodiment of the present invention, and is a sectional view illustrating a partial configuration thereof including its shaft core C. As illustrated in FIG. 8, in a rotor shaft 18 included in the electric motor 80 of the present embodiment, a spline groove 24 splined to an output shaft 20 is formed so as to extend to a position corresponding to a radial oil passage 34 in a shaft-core-C direction. A connection opening 40 of the radial oil passage 34 with respect to a shaft-core oil passage 28 is provided in a part where the spline groove 24 is not formed. That is, in the present embodiment, the spline groove 24 corresponds to an inner wall, that is, a groove that is not provided with the connection opening 40, in the shaft-core oil passage 28. Here, the number of spline grooves 24 is an integral multiple of the number of magnets 36 provided in a rotor 16. Even in such a configuration, it is possible to successfully balance cooling of the electric motor 80 with lubrication thereof, and it is also possible to reduce a man-hour in a manufacturing process thereof in comparison with a configuration in which the groove 44 is formed separately from the spline groove 24, similarly to the electric motor 10 illustrated in FIG. 1, or the like. Besides, it is possible to realize more effective lubrication of a bearing 22b via the spline groove 24.

The preferred embodiments of the present invention have been described in detail with reference to the drawings. However, the present invention is not limited to this, and various modifications can be added to perform the present invention within a range that does not deviate from the gist of the present invention.

What is claimed is:

1. An electric motor comprising:
   a rotor shaft having:
      a shaft-core oil passage placed in a shaft core of the rotor shaft in a coaxial manner with the rotor shaft, the shaft-core oil passage including an inner wall facing radially inward; and
      radial oil passages provided toward a radial outer side of the rotor shaft from the shaft-core oil passage, the radial oil passages penetrating through the rotor shaft, the radial oil passages having respective first connection openings connected to the shaft-core oil passage, so that oil that is not discharged from the first connection openings to the radial oil passages is supplied to other supply destinations, a distance of the first connection openings from the shaft core is shorter than a distance, from the shaft core, of a part of the inner wall which is not provided with the first connection openings, and the part of the inner wall which is not provided with the first connection openings being grooves extending in a shaft-core direction, a number of the grooves being an integral multiple of a number of magnets provided in a rotor within which the rotor shaft is located, and a phase of each of the magnets in a circumferential direction of the rotor shaft corresponds to a phase of at least one of the radial oil passages.

2. The electric motor according to claim 1, further comprising a bearing configured to pivotally support the rotor shaft, wherein
   the rotor shaft has a lubrication oil passage, so that the lubrication oil passage guides the oil in the shaft-core oil passage to the bearing,
   the lubrication oil passage has a second connection opening connected to the shaft-core oil passage, and
   a distance of the second connection opening from the shaft core is longer than a distance of at least one of the first connection openings from the shaft core.

3. The electric motor according to claim 1, further comprising a source configured to supply the oil to the shaft-core oil passage, so that the source supplies more oil to the shaft-core oil passage as a rotation speed of the electric motor increases.

* * * * *